Figure 1:
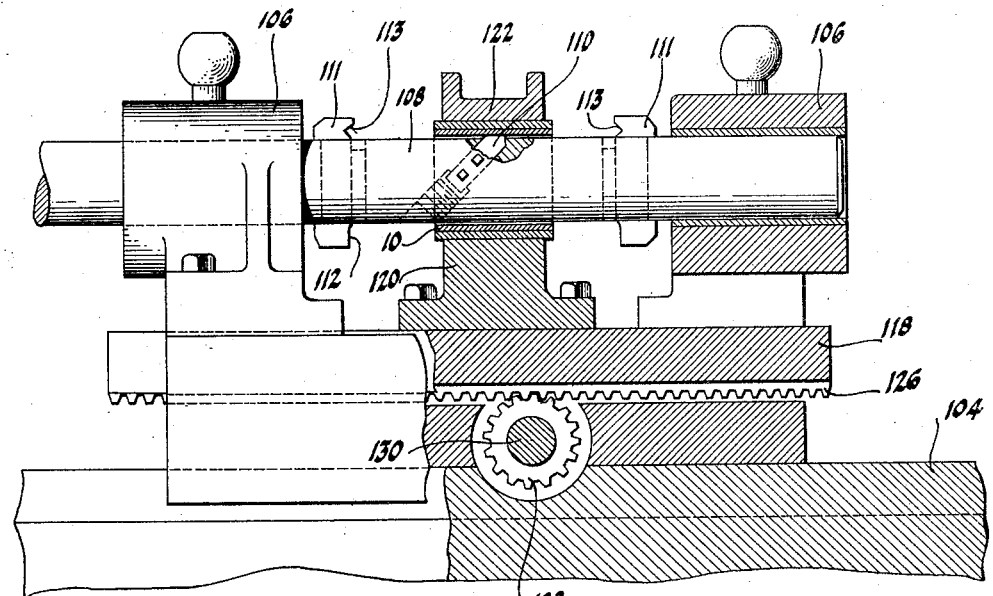

Feb. 28, 1933. C. LANDERS 1,899,700

TURNING AND BORING MACHINE

Original Filed Jan. 23, 1928

Inventor
Charles Landers
By Blackmore, Spencer & Hink
Attorneys

Patented Feb. 28, 1933

1,899,700

UNITED STATES PATENT OFFICE

CHARLES LANDERS, OF LANSING, MICHIGAN

TURNING AND BORING MACHINE

Original application filed January 23, 1928, Serial No. 248,842. Divided and this application filed November 20, 1929. Serial No. 408,495.

This invention relates to the manufacture of bearings of the interchangeable type commonly used on automobile engines, and this application has to do particularly with a bearing turning and boring machine such as is disclosed in my prior application, S. N. 248,842, filed January 23, 1928 which has matured into Patent No. 1,761,926, issued June 3, 1930, of which this is a division. In such prior application, the bearing back is formed from sheet metal, such as brass or steel, by cutting it to length and forming it up into the shape of a half bearing. This half bearing is then coated with tin and babbitt, and the parting line, that is, the meeting edges of the bearing halves is machined, as by broaching.

The next step consists in boring the halves, trimming them off to length and bevelling the ends. These operations may all be performed on one machine, which machine is the subject matter of the present application. It will be understood however, that this machine may obviously be employed for turning and boring bearings which have been previously formed by other steps than those disclosed in my prior application, or other articles of cylindrical form.

According to the present invention, these operations are performed by placing a pair of bearings together and mounting the cylinder thus formed in a holder within which rotates an arbor carrying a cutter for the inside boring as well as spaced cutters for trimming the cylinder to length and bevelling its ends. The cutting to length is governed by stops of any usual character on the machine, thus insuring accuracy.

Subsequent operations necessary to finishing the bearing are not set forth herein as they form no part of the present invention.

Figure 2:
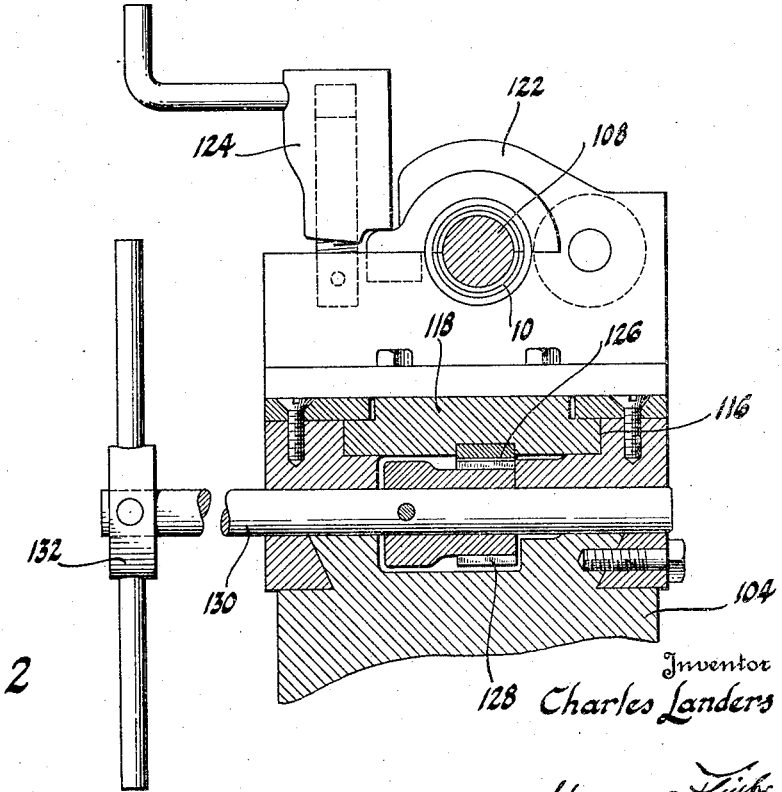

In the drawing:

Figure 1 is a side elevation, partly in section, and Figure 2 is a transverse sectional view thereof.

In the apparatus illustrated, 104 indicates the base of the machine which carries spaced bearings 106 for a rotating shaft 108 carrying the cutter 110 for inside turning and spaced cutters 111 bearing blades 112 for trimming to length and blades 113 for chamfering.

Upon the base 104 are arranged guides 116 within which slides member 118 carrying the bearing 120 having a hinged portion 122 which may be locked to the lower half by the clamping member 124. The slide 118 carries rack 126 engaged by pinion 128 carried by a shaft 130 which may be rotated by handle 132.

In the operation of this device the clamping member 122 is swung to open position and a pair of bearing halves are inserted in position surrounding the shaft 108. The member 122 is then swung down and locked in place. Shaft 108 is then rotated and with the parts in the position shown in Figure 1 the interior of the bearings is bored. During this operation the slide 118 is advanced along the shaft either manually or automatically so that the entire inner surface is machined.

At this time the handle 132 is manipulated to move the slide 118 and the bearings carried thereby into engagement with first one and then the other of the cutters 112 and 113 for trimming to length and chamfering the ends. The machine is preferably provided with fixed stops to limit the extent of the last-named cuts. The slide 118 may then be moved to its other extreme position where the other end is trimmed.

While this operation has been described as though the interior boring were the first operation to be performed, it will obviously be found most convenient to start with the slide 118 at one of its extreme positions, trim one end, move the slide through its intermediate position for the interior boring and to its other extreme position for the chamfering. The bearings are at this time removed from the holder and new bearings substituted and the operation repeated in reverse sequence.

It will be seen from the foregoing that I have designed a machine for performing this series of operations which is simple both in structure and operation, insuring accuracy with a minimum amount of time and labor, and which is capable of use not only in turning and boring semi-cylindrical bearing halves, but also in performing these various operations on other cylindrical or semi-cylindrical articles.

In drafting the claims herein, the patents to Smith, 466,728 and Austin 1,094,187, cited in applicant's prior case, have been considered.

I claim:

1. The combination of a rotatable shaft, cutting elements longitudinally spaced on said shaft comprising immovably spaced end facing tools and an interior boring tool arranged between said end facing tools, disconnectible clamping means surrounding said shaft and arranged to clamp a plurality of bearing segments in the form of a cylinder about the shaft between the end facing tools, means for rotating said shaft, and means for producing relative longitudinal movement of said shaft and clamping means, whereby the bearing segments are caused to engage the end facing tools to face the ends of the segments, and to pass over the interior boring tool to bore the interior of said segments.

2. A combined interior boring and end facing machine having rotatable cutting elements constituting end facing and boring means immovably fixed in spaced relation to each other, work holding means for clamping bearing segments about the axis of rotation of said cutting elements and between said end facing means, and movable along said axis of rotation to engage the ends of the work held thereby successively with the end facing means, and to engage the interior thereof with the boring means.

3. In a machine of the class described, a rotatable shaft, immovably spaced end facing tools fixed on said shaft, an interior boring tool on said shaft intermediate said end facing tools and in spaced relation thereto, work clamping means for holding bearing segments about said shaft between said end facing tools, and means for relatively moving said clamping means and rotatable shaft during rotation of the latter to successively engage the work with said end facing tools and said boring tool.

In testimony whereof I affix my signature.

CHAS. LANDERS.